United States Patent
La Grenade et al.

(10) Patent No.: US 8,528,094 B1
(45) Date of Patent: Sep. 3, 2013

(54) AUTOMATED INFORMATION ASSOCIATION AND REPORTING

(75) Inventors: Jimmy La Grenade, Wylie, TX (US); Ajay Barve, Coppell, TX (US); Casey A. Harris, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 1008 days.

(21) Appl. No.: 11/956,462

(22) Filed: Dec. 14, 2007

(51) Int. Cl.
G06F 11/00 (2006.01)

(52) U.S. Cl.
USPC .......................................................... 726/25

(58) Field of Classification Search
USPC .......................................................... 726/25
See application file for complete search history.

(56) References Cited

U.S. PATENT DOCUMENTS

| | | | |
|---|---|---|---|
| 7,237,258 B1 * | 6/2007 | Pantuso et al. | 726/11 |
| 2006/0020814 A1 * | 1/2006 | Lieblich et al. | 713/182 |
| 2008/0016563 A1 * | 1/2008 | McConnell et al. | 726/22 |

* cited by examiner

Primary Examiner — Philip Chea
Assistant Examiner — Daniel Hoang
(74) Attorney, Agent, or Firm — Banner & Witcoff, Ltd.; Michael A. Springs (57) ABSTRACT

A system, method and apparatus for associating data is presented. An association system generally includes a vulnerability information system, user identification system and association tool. The vulnerability information system performs a scan of client devices to identify vulnerable devices. The vulnerability information is transmitted to the association tool where it is cross referenced with user identification information received from the user identification system. The association tool identifies the user associated with the vulnerable devices and this information may be stored to generate historical trend information. In addition, the information may be displayed graphically or may be used to generate reports and identify metrics that can be monitored in order to improve reliability, efficiency and the like.

18 Claims, 7 Drawing Sheets

AUTOMATED INFORMATION ASSOCIATION AND REPORTING

BACKGROUND

With the frequency of email communication and the prevalent access to the internet, today's computer users are more susceptible to computer viruses than ever. A computer virus can virtually destroy a computer, resulting in costly repairs or replacement. In order to manage the risk associated with computer viruses and other electronic device vulnerabilities, networks and associated client devices, such as computers, are scanned to identify computers that pose a high risk or are deemed vulnerable to a virus. In addition to identifying the computer, the user of that computer should also be identified to determine the cause of the risk and any action that can be taken to reduce the risk of contracting a virus. This process of scanning network computers and identifying users associated with each computer identified as being a high risk computer can be time consuming and inefficient.

SUMMARY

Aspects described herein relate to systems, methods and apparatuses for associating client device information with user information for that device. In one arrangement, one or more client devices are scanned to identify vulnerable client devices. In some arrangements, the scan identifies client devices that have contracted or are susceptible to various types of vulnerabilities including viruses, phishing applications, application security flaws and the like. The results of the scan are transmitted to an association tool. The association tool also receives user identification information including the name or other unique identification information of one or more users associated with each client device. Once the results of the scan and user information are received, the information is cross referenced at the association tool or system and the user associated with each of the vulnerable devices is identified. This association information, as well as the vulnerability information and user identification information may be stored (e.g., together or in association with one another)

According to one or more aspects described herein, once the association tool or system has associated the vulnerable device with the appropriate user or line of business (e.g., a company department), that information may be processed to generate reports or provide actionable information to an administrator or other user. In some examples, the association, vulnerability and/or user information may be stored in order to generate historical information. This historical information may be displayed graphically in order to indicate trends or to provide a visual indication of measures such as the number of vulnerable devices, frequency of a device being deemed vulnerable, and the like. This stored information may also be used to generate reports and may be used to identify various metrics that can be monitored and used as a measure to track and improve reliability, efficiency, and the like. In one example, a user who is frequently identified as having vulnerabilities in his or her computing device may be identified based on trend and historical data and interviewed to determine the cause.

According to still other aspects described herein, once the association between the user and the vulnerable device has been made, the user may receive an email communication or other notification that one or more client devices associated with him or her has been identified as a vulnerable device. This communication may include instructions for remedying the vulnerability of the device or other action that may be taken.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the claimed subject matter, as well as the following detailed description of illustrative embodiments, is better understood when read in conjunction with the accompanying drawings, which are included by way of example, and not by way of limitation with regard to the claimed subject matter.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
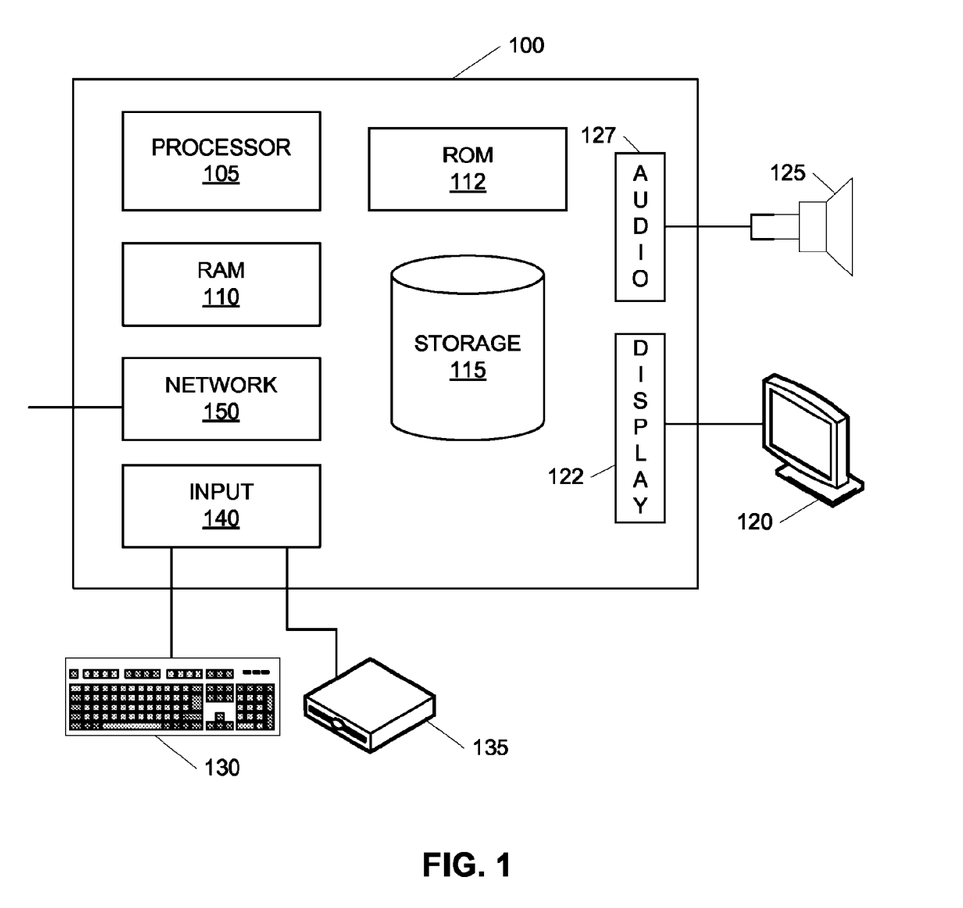
FIG. 1 illustrates a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable mediums such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through a microphone (not shown) may be converted into a digital format and stored in a data file. In another example, credit card input may be received through a card reader (not shown) and converted into a digital format. In one or more instances, a device such as media drive 135 may act as both an input and output device allowing users to both write and read data to and from the storage media (e.g., DVD-R, CD-RW, and the like).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
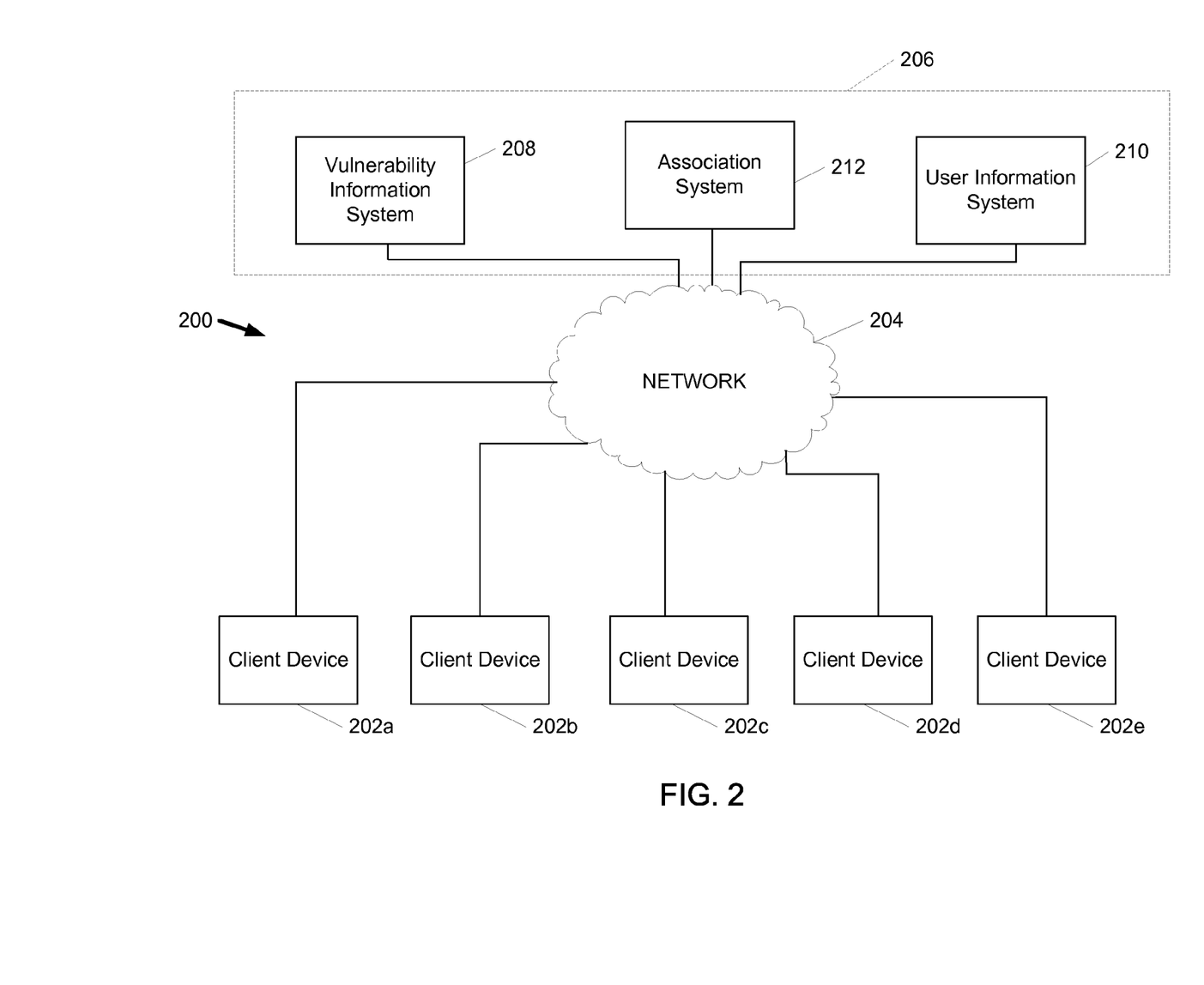
FIG. 2 illustrates an information association environment according to one or more aspects described herein.

Computer 100 of FIG. 1 may be incorporated into a variety of information association systems for associating device vulnerability information with a user or business or line of business associated with the vulnerable device. FIG. 2 illustrates one example information association environment in which determined computer vulnerability information may be associated with one or more users of vulnerable devices. For example, environment 200 includes multiple client devices 202a-e, such as PCs, laptops, mobile devices and the like. Each of the client devices 202a-e may be used by one or more users. The client devices 202a-e may exist within a single company or organization and may be part of a closed system such as an intranet. In another arrangement, the client devices 202a-e may exist in an open area network such as the Internet. The client devices 202a-e may include computer identification information, such as a device name, ID number, MAC address or IP address that allows a scanning system to identify each client device. This device identification information may be stored at a central server or database or on each client device 202a-e.

The client devices 202a-e are connected via a network 204. The network 204 may be any type of suitable network for connecting various client devices 202a-e, such as a local area network (LAN), wide area network (WAN), cellular network and the like. The network 204 also includes information association system 206. The information association system 206 may include one or more servers or databases and may include any hardware and or software for performing one or more of the functions described below.

Information association system 206 generally includes a vulnerability information system 208, a user information system 210 and an association system 212. These systems may exist as separate devices or may be components of a single server or system. Further, systems 208, 210 and 212 may be implemented in hardware, software and/or firmware.

Vulnerability information system 208 may generally be configured to scan client devices 202a-e connected to the network 204 and to identify one or more client devices 202a-e that are considered vulnerable. Vulnerabilities may be defined in a variety of ways and may be defined based on the preferences and needs of a user or organization. For example, in one arrangement, a client device 202a-e may be identified as vulnerable if it is considered susceptible to contracting one or more known viruses. Such client devices 202a-e may already have a computer virus or, alternatively or additionally, may have deficient anti-virus software, such as an out of date version of its anti-virus software, leaving that client device 202a-e susceptible to receiving a new virus. In another example, a vulnerability may be defined by not having the latest patches for an operating system. The time required for each scan may vary depending on the number of client devices 202a-e being scanned. In one arrangement, the scan may be performed in less than sixty (60) minutes. In still other arrangements, the scan may be performed in thirty (30) minutes. Further, the scan may be performed on all client devices 202a-e associated with a particular network 204. Alternatively, the scan may be performed on a portion of the client devices 202a-e on that system or network 204.

Upon identifying one or more vulnerable client devices, the vulnerability information system 208 extracts identification information for each detected vulnerable device. That is, the vulnerability information system 208 extracts identification information (e.g., MAC address, IP address, and the like) for the vulnerable device. Once this information is extracted for each vulnerable device, the information may be stored, either as part of or separately from, the device identification information. This vulnerability information may be stored in order to establish historical information about the vulnerability of the client devices. This aspect will be discussed more fully below.

The user information system 210, on the other hand, generally includes user information associated with each of the client devices 202a-e. That is, user information system 210 may store information relating to which users or lines of business own, are responsible for or are using a particular device. The user information system 210 may be updated on a monthly, weekly, daily, and the like basis to maintain accurate information regarding users of various client devices 202*a-e*. The user information system 210 may include information including an identification number (e.g., an IP address, a network name, MAC address) for each client device 202*a-e*. This unique identification number may be identical to the unique identification number stored in the vulnerability information system 208. The user information system 210 may also store the names and/or other identifying information for one or more users associated with each client device 202*a-e*. For example, the user information system may store identifiers such as name, employee number, social security number, and the like, for each user associated with each client device 202*a-e*. A user may also be an organization or department within an organization.

Further, association tool or system 212 generally includes hardware and software configured to associate the identified vulnerable client device(s) with the user of each vulnerable device. For example, the association tool or system 212 will receive vulnerability information from the vulnerability information system 208 that identifies one or more vulnerable client devices. The association tool 212 also receives information about users associated with each client device 202*a-e*. That information is cross referenced with the vulnerability information to identify one or more users associated with each vulnerable device. This information may then be stored on the association system for later processing, as will be discussed further below.

Figure 3:
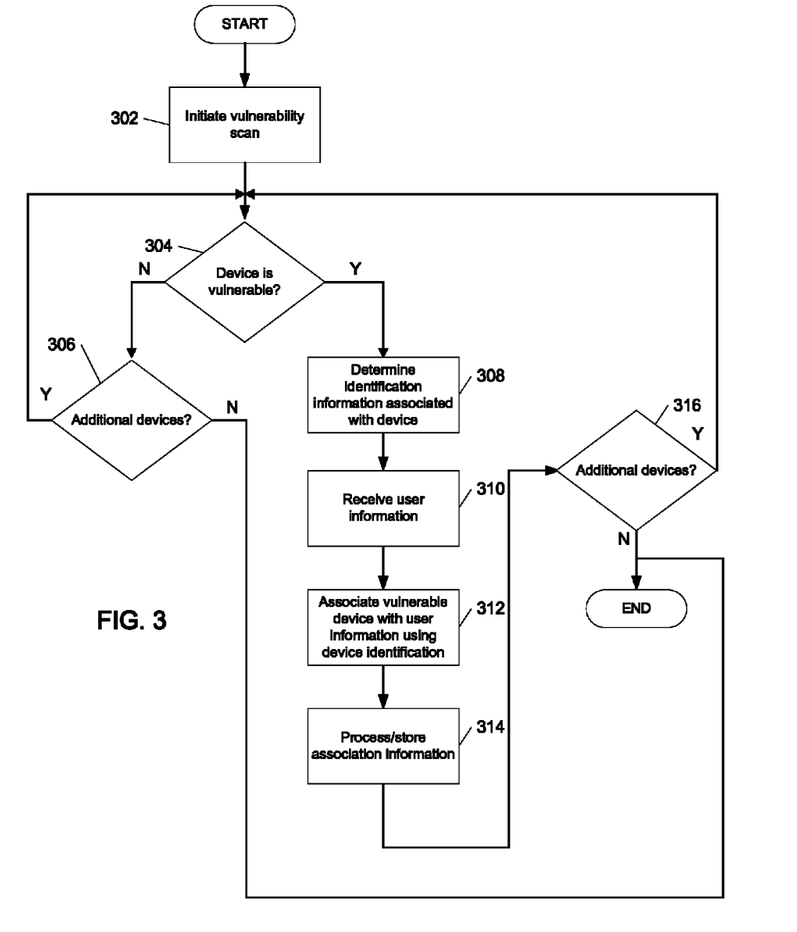
FIG. 3 is a flowchart illustrating a method for associating device vulnerability information with user information according to one or more aspects described herein.

FIG. 3 is a flow chart illustrating one method for associating client device vulnerability information with user information. In step 302, a vulnerability scan is initiated. This scan may be initiated by a user or may be an automated process that is initiated at a predetermined date or time. In some arrangements, the scan may be performed continuously. For example, upon completion of a first scan, a second scan will begin. Upon completion of the second scan, a third scan will begin, and the like.

Once the scan is initiated, the client devices connected to that network or system, and designated for scanning, are identified and scanned. The scan begins with determining whether a first client device scanned is vulnerable, as shown in step 304. As discussed above, this determination may be made based on criteria chosen by the user of the information association system. In the arrangement shown in FIG. 3, the vulnerability of the first device may be determined based on whether the device has, or is susceptible to, one or more computer viruses. If that device is deemed not vulnerable in step 306, the scan continues to determine if there are additional devices to be scanned. If there are no additional devices, the scan is completed. If there are additional devices, the scan resumes at step 304 to determine if the next device scanned is considered vulnerable. If the device is considered vulnerable, the association system may determine identification information associated with the vulnerable device in step 308.

In step 310, user information is received from a user information system at the association tool or system. The user information received may generally include information identifying one or more users of each client device. As discussed above, the identifying information may include the user's name, employee number, social security number, and the like. In step 312, the association tool associates the vulnerable device with the user of that device. For instance, the vulnerability information transmitted is cross referenced with the user identification information to identify one or more users of the vulnerable client device. Once the association information is generated, the information may be stored or may undergo further processing, as indicated in step 314. This processing will be discussed more fully below.

In step 316, a determination is made as to whether there are additional client devices to be scanned. If there are no additional devices, the scan is completed. If there are additional devices, the scan continues by returning to step 304 to determine if the next device is a vulnerable device. The process continues until all devices are scanned.

It should be noted that the sequence of the scan and association processes may occur in various ways. For instance, as described above, the scan may be performed on a device-by-device basis. That is, each device may be scanned and a determination may be made as to whether it is a vulnerable device. Once that determination is made, the device is identified and associated with the user of that device. That information may be stored or processed further and, if there are additional devices to be scanned, the next device is considered. In other arrangements, the devices may be scanned one after another. Once all vulnerable devices in the scan have been identified, the vulnerability information for all devices may be sent to the association tool. The association tool or system may then associate all vulnerable devices with the appropriate user based on user identification information received from the user identification system. The steps of the method described may be performed in this or one of several other orders without departing from the invention described herein.

Figure 4:
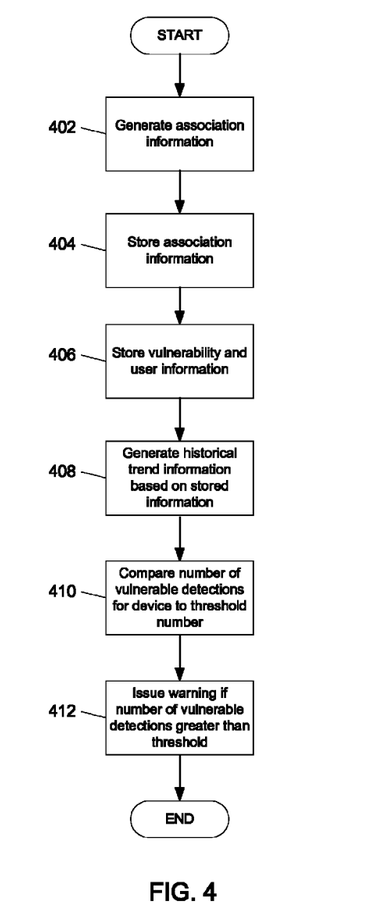
FIG. 4 is a flowchart illustrating a method for processing association information according to one or more aspects described herein.

FIG. 4 is a flowchart illustrating one method for processing association information. In step 402, the association information is generated. This association information may be generated as described above with respect to the systems illustrated in FIGS. 1 and 2, and the method described in reference to FIG. 3. The association information is stored in step 404. Storage of the association information may be performed at the association system, vulnerability information system, user information system, or elsewhere on the association system. Additionally or alternatively, the association information may be stored remotely, in a system separate from the association system. Storage of the association information may also include storage of the vulnerability information and/or storage of the user identification information, as shown in step 406. Storage of this information may allow for generation of historical information relating to the client devices scanned, such as historical information regarding devices that are vulnerable and users associated with vulnerable devices, as shown in step 408. Trend information may also be generated for a single user or line of business. For example, a trend for a user may show the vulnerabilities of the devices that that user has owned over a period of time.

According to one aspect, a trend may include a number of times a device has been found to be vulnerable in a given period of time. The number of times a device has been found to be vulnerable may be compared to a threshold number in step 410. If the number of vulnerable detections is greater than the threshold, the association system may issue a warning or alert in step 412. Other actions may also be taken if a device or user is determined to have a high number of vulnerable detections relative to the threshold. For example, external network access (e.g., to the Internet) may be blocked for the device or user.

The threshold number of detections may be determined or set by a user or administrator. For instance, a user or administrator may determine that a device deemed vulnerable ten times in a period of 2 months should be considered a repeat offender. In another arrangement, a device found vulnerable three times over the course of 2 months may be considered a repeat offender.

Figure 5:
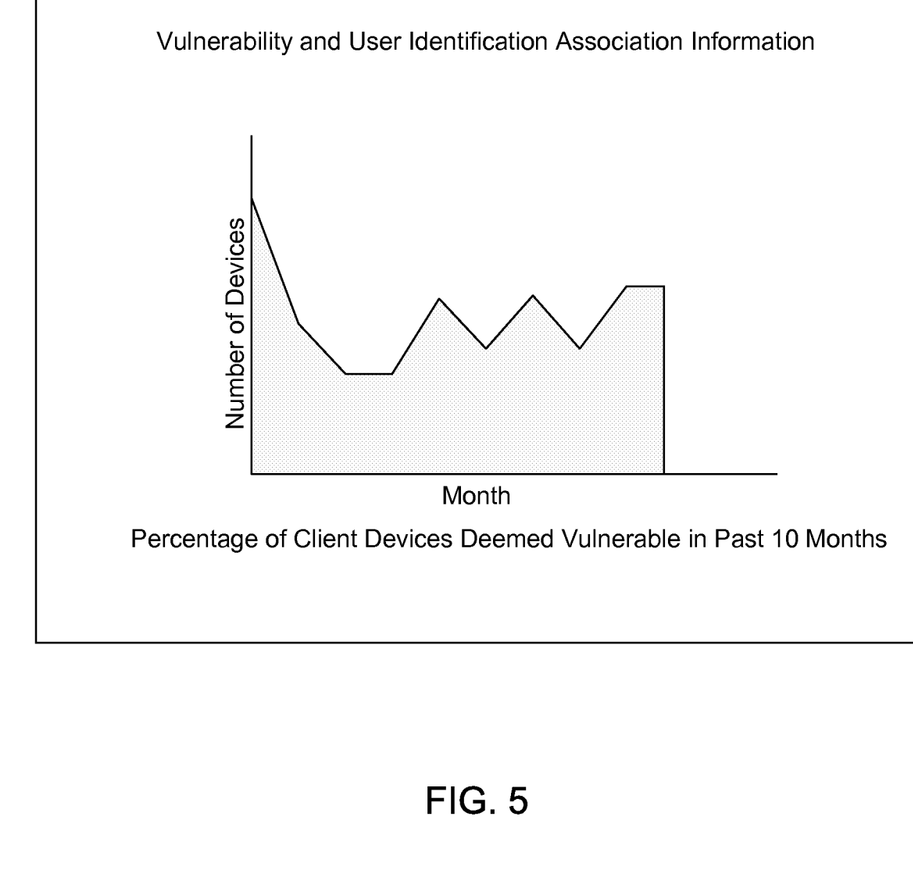
FIG. 5 illustrates a user interface displaying processed association information according to one or more aspects described herein.

The historical information may be displayed in a variety of ways. For example, the historical information may be displayed graphically on a computer display or other device, as shown in FIG. 5. The line graph 502 shown in FIG. 5 may depict any of a variety of measures that may be determined from the historical information. For example, the graph may indicated the number of devices found vulnerable in each month for the last ten months, as shown in FIG. 5. In another example, the line graph may indicate the number of times a particular user has been associated with a vulnerable device over a predetermined time period.

In addition, the historical information may be represented in a number of different ways. For instance, in addition to the line graph shown in FIG. 5, various data points from the historical information may be displayed on a bar graph to illustrate trends in the data. For example, each bar of the graph may illustrate a percentage of scans for which that device was found vulnerable. In another example, the bar graph may illustrate the percentage of scans for which a user was associated with a vulnerable device. In still another example, the bar graph may illustrate the number or percentage of devices that were deemed vulnerable for one or more months in a given time period. In still other examples, historical information may be used to create a pie chart displaying various measures determined from the historical data.

Figure 6:
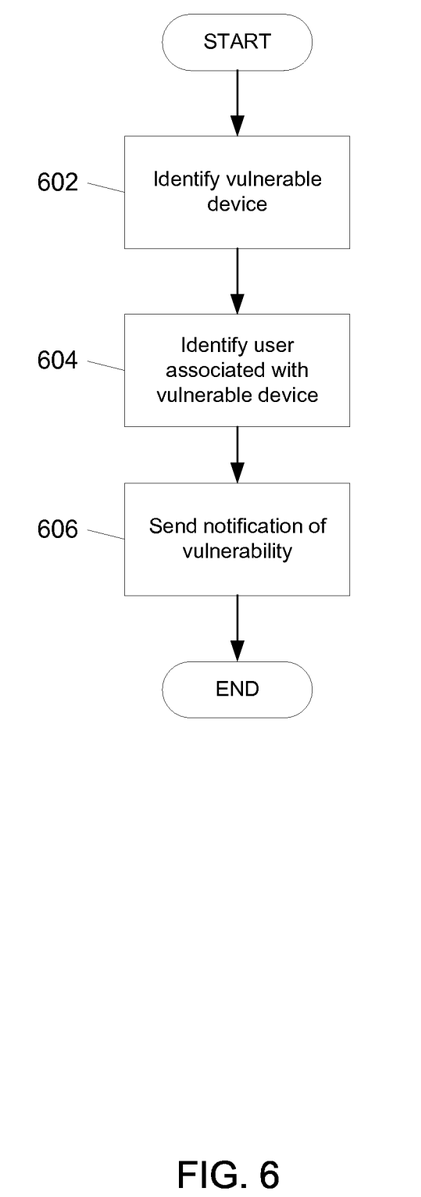
FIG. 6 is a flowchart illustrating another method for processing association information according to one or more aspects described herein.

FIG. 6 is a flowchart illustrating another method of processing association information. In step 602, one or more vulnerable devices are identified. This identification may be made using the systems described with reference to FIGS. 1 and 2, and the method described with reference to FIG. 3. The vulnerable devices are then associated with the user of each device at an association tool, as described above and shown in step 604. Once the user associated with a vulnerable device is identified, a notification may be sent indicating that a vulnerability has been detected in the device, in step 606. For example, a user associated with a vulnerable device may receive an email or other communication indicating that he/she is associated with a vulnerable device. This communication may include instructions for future use to prevent additional problems or may provide action items to remedy the current deficiency with the device. In addition, a notice, such as an email or other correspondence, may be sent to the organization's technology department to indicate that there is a problem or potential problem with the vulnerable device so that action can be taken to remedy the situation. In one or more arrangements, a vulnerability detection and association system may have access to a knowledge database from which known solutions for vulnerabilities and ways to avoid vulnerabilities may be extracted automatically and embedded in automated messages to offending users or devices.

In some arrangements, users associated with devices that have been identified as vulnerable a predetermined number of times may receive additional notifications or may have user privileges revoked as discussed above. For example, a user associated with one or more vulnerable devices three or more times may receive a more harshly worded e-mail notification or may receive a negative notation in his or her performance evaluation.

Figure 7:
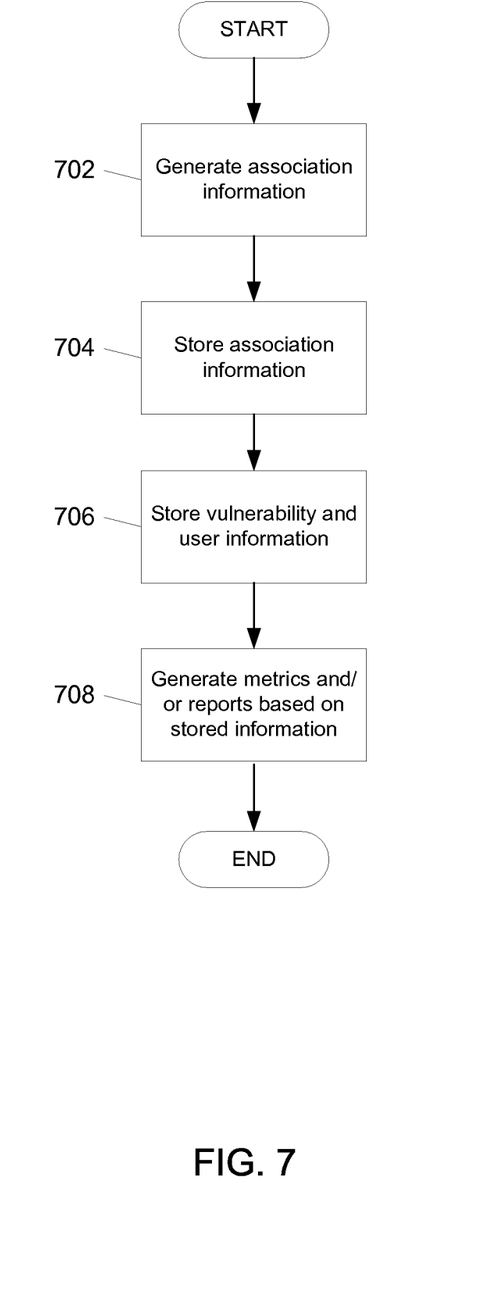
FIG. 7 illustrates yet another method for processing association information according to one or more aspects described herein.

FIG. 7 is a flowchart illustrating a method of processing association information and generating metrics based on vulnerability information. In step 702, the association information is generated. This association information may be generated as described above with respect to the systems illustrated in FIGS. 1 and 2, and the method described in reference to FIG. 3. The association information is stored in step 704. Storage of the association information may be performed at the association tool, vulnerability information system, user information system, or elsewhere on the association system. Additionally or alternatively, the association information may be stored remotely, in a system separate from the association system. Storage of the association information may also include storage of the vulnerability information and/or storage of the user identification information, as shown in step 706. Storage of this information may be performed in order to generate various reports conveying the vulnerability, user and association information. For instance, various reports may be generated upon completion of a scan to convey to an administrator not only which devices are vulnerable but how many and/or what types of devices are vulnerable, as well as other information that can be extracted from the stored information.

In some arrangements, the stored information can be used to extract various data points to be used in statistical analysis. For example, the stored data can be used to determine various metrics that can be monitored and measured over a period of time in an effort to improve reliability, efficiency, and the like.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods as described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:
1. A computer-implemented method comprising:
receiving vulnerability information identifying a first vulnerable device from a plurality of scanned devices, wherein the plurality of scanned devices were scanned in response to at least one of a user initiating a scan, an automated scan being initiated, a periodic scan being performed, or a continuous scan being performed, wherein the vulnerability information includes device identification information of the first vulnerable device, and wherein the first vulnerable device includes one or more of the following conditions: is susceptible to contracting one or more computer viruses; has a computer virus; has deficient anti-virus software; or does not have current patches for an operating system;
receiving, from the first vulnerable device, user information identifying a user associated with the device identification information, wherein the user information identifying the user associated with the device identification information comprises information uniquely identifying a user who has utilized the first vulnerable device, and wherein the user who has utilized the first vulnerable device is at least one of an owner of the first vulnerable device, an administrator of the first vulnerable device, or a user of the first vulnerable device;
storing the user information identifying the user associated with the device identification information;

associating the identified first vulnerable device with the user associated with the device identification information by cross-referencing the user information and vulnerability information;

storing the association between the vulnerability information and the user;

periodically updating the user information identifying the user associated with the device identification information to reflect one or more potential changes in the user information or the device identification information;

determining, by a computer, a historical trend from the vulnerability information and associated user information, the historical trend indicating a number of times the user has been associated with the first vulnerable device over a predetermined time period comprising one or more months;

determining whether the number of times the user has been associated with the first vulnerable device over the predetermined time period comprising the one or more months exceeds a first predetermined threshold; and responsive to determining that the number of times the user has been associated with the first vulnerable device over the predetermined time period comprising the one or more months exceeds the first predetermined threshold:

blocking external network access to the first vulnerable device;

sending the user a notification indicating that a vulnerability associated with the first vulnerable device has been detected, the notification comprising instructions extracted from a knowledge base for remedying the vulnerability associated with the first vulnerable device;

determining whether a number of times the user has been identified as being associated with one or more vulnerable devices exceeds a second predetermined threshold; and responsive to determining that the number of times the user has been identified as being associated with one or more vulnerable devices exceeds the second predetermined threshold:

identifying the user as a repeat offender;

blocking external network access to said user; and sending the user an additional notification, the additional notification indicating that the user has been identified as being associated with one or more vulnerable devices a number of times that exceeds the second predetermined threshold.

2. The computer-implemented method of claim 1, wherein the vulnerability information is received from a separate scanning device.

3. The computer-implemented method of claim 1, wherein the user includes a line of business for a company.

4. The computer-implemented method of claim 1, further comprising formatting the association information for display.

5. The computer-implemented method of claim 1 further comprising:

determining a number of times the user has been associated with a vulnerable device; and restricting user access to one or more resources if the determined number of times is greater than a specified threshold.

6. The computer-implemented method of claim 5, wherein the vulnerability information is received at least ten times in a 24 hour period.

7. A computer-implemented method comprising:

identifying at least a first vulnerable device, from a plurality of scanned devices, based on vulnerability information received, wherein the plurality of scanned devices were scanned in response to at least one of a user initiating a scan, an automated scan being initiated, a periodic scan being performed, or a continuous scan being performed, wherein the vulnerability information includes device identification information for one or more vulnerable devices, and wherein the first vulnerable device includes one or more of the following conditions: is susceptible to contracting one or more computer viruses; has a computer virus; has deficient antivirus software; or does not have current patches for an operating system;

receiving, from the first vulnerable device, user information identifying at least one user of the plurality of scanned devices, wherein the user information identifying the at least one user of the plurality of scanned devices comprises information uniquely identifying a user who has utilized the first vulnerable device, and wherein the user who has utilized the first vulnerable device is at least one of an owner of the first vulnerable device, an administrator of the first vulnerable device, or a user of the first vulnerable device;

storing the user information identifying the at least one user of the plurality of scanned devices;

associating the user information with the vulnerability information of the first vulnerable device;

storing the association between the vulnerability information and the user information;

periodically updating the user information identifying the at least one user of the plurality of scanned devices to reflect one or more potential changes in the user information or the device identification information;

determining, by a computer, a historical trend from the vulnerability information and associated user information, the historical trend indicating a number of times one or more users have been associated with the first vulnerable device over a predetermined time period comprising one or more months;

displaying the historical trend;

determining whether the number of times the one or more users have been associated with the first vulnerable device over the predetermined time period comprising the one or more months exceeds a first predetermined threshold; and responsive to determining that the number of times the one or more users have been associated with the first vulnerable device over the predetermined time period comprising the one or more months exceeds the first predetermined threshold:

blocking external network access to the first vulnerable device;

sending the one or more users a notification indicating that a vulnerability associated with the first vulnerable device has been detected, the notification comprising instructions extracted from a knowledge base for remedying the vulnerability associated with the first vulnerable device;

determining whether the one or more users have been identified as being associated with one or more vulnerable devices a number of times that exceeds a second predetermined threshold; and responsive to determining that the one or more users have been identified as being associated with one or more vulnerable devices a number of times that exceeds the second predetermined threshold:
identifying the one or more users as repeat offenders;
blocking external network access to said one or more users; and
sending the one or more users an additional notification, the additional notification indicating that the one or more users have been identified as being associated with one or more vulnerable devices a number of times that exceeds the second predetermined threshold.

8. The computer-implemented method of claim 7, wherein the historical trend is displayed graphically.

9. The computer-implemented method of claim 8, wherein the historical trend is displayed at a website.

10. The computer-implemented method of claim 7, further including generating a report including the vulnerability information.

11. The computer-implemented method of claim 7, further including forwarding an email to the user associated with the first vulnerable device.

12. The computer-implemented method of claim 7, further including identifying a plurality of vulnerable devices based on vulnerability information received.

13. An apparatus comprising:
a processor; and
memory storing computer readable instructions that, when executed by the processor, cause the apparatus to perform a method comprising:
receiving vulnerability information identifying a first vulnerable device from a plurality of scanned devices, wherein the plurality of scanned devices were scanned in response to at least one of a user initiating a scan, an automated scan being initiated, a periodic scan being performed, or a continuous scan being performed, wherein the vulnerability information includes device identification information of the first vulnerable device, and wherein the first vulnerable device includes one or more of the following conditions: is susceptible to contracting one or more computer viruses; has a computer virus; has deficient anti-virus software; or does not have current patches for an operating system;
receiving, from the first vulnerable device, user information identifying a user associated with the device identification information, wherein the user information identifying the user associated with the device identification information comprises information uniquely identifying a user who has utilized the first vulnerable device, and wherein the user who has utilized the first vulnerable device is at least one of an owner of the first vulnerable device, an administrator of the first vulnerable device, or a user of the first vulnerable device;
storing the user information identifying the user associated with the device identification information;
associating the identified first vulnerable device with the user associated with the device identification information by cross-referencing the user information and vulnerability information;
storing the association between the vulnerability information and the user;
periodically updating the user information identifying the user associated with the device identification information to reflect one or more potential changes in the user information or the device identification information;
determining a historical trend from the vulnerability information and associated user information, the historical trend indicating a number of times the user has been associated with the first vulnerable device over a predetermined time period comprising one or more months;
determining whether the number of times the user has been associated with the first vulnerable device over the predetermined time period comprising the one or more months exceeds a first predetermined threshold; and
responsive to determining that the number of times the user has been associated with the first vulnerable device over the predetermined time period comprising the one or more months exceeds the first predetermined threshold:
blocking external network access to the first vulnerable device;
sending the user a notification indicating that a vulnerability associated with the first vulnerable device has been detected, the notification comprising instructions extracted from a knowledge base for remedying the vulnerability associated with the first vulnerable device;
determining whether the user has been identified as being associated with one or more vulnerable devices a number of times that exceeds a second predetermined threshold; and
responsive to determining that the user has been identified as being associated with one or more vulnerable devices a number of times that exceeds the second predetermined threshold:
identifying the user as a repeat offender;
blocking external network access to said user; and
sending the user an additional notification, the additional notification indicating that the user has been identified as being associated with one or more vulnerable devices a number of times that exceeds the second predetermined threshold.

14. The apparatus of claim 13, wherein the vulnerability information is received from a separate scanning device.

15. The apparatus of claim 13, the memory further storing instructions for:
determining a number of times the user has been associated with a vulnerable device; and
restricting user access to one or more resources if the determined number of times is greater than a specified threshold.

16. One or more non-transitory computer readable media storing computer readable instructions that, when executed by a processor, cause the processor to perform a method comprising:
receiving vulnerability information identifying a first vulnerable device from a plurality of scanned devices, wherein the plurality of scanned devices were scanned in response to at least one of a user initiating a scan, an automated scan being initiated, a periodic scan being performed, or a continuous scan being performed, wherein the vulnerability information includes device identification information of the first vulnerable device, and wherein the first vulnerable device includes one or more of the following conditions: is susceptible to contracting one or more computer viruses; has a computer virus; has deficient anti-virus software; or does not have current patches for an operating system;

receiving, from the first vulnerable device, user information identifying a user associated with the device identification information, wherein the user information identifying the user associated with the device identification information comprises information uniquely identifying a user who has utilized the first vulnerable device, and wherein the user who has utilized the first vulnerable device is at least one of an owner of the first vulnerable device, an administrator of the first vulnerable device, or a user of the first vulnerable device;

storing the user information identifying the user associated with the device identification information;

associating the identified first vulnerable device with the user associated with the device identification information by cross-referencing the user information and vulnerability information;

storing an association between the vulnerability information and the user;

periodically updating the user information identifying the user associated with the device identification information to reflect one or more potential changes in the user information or the device identification information;

generating a historical trend of the stored association, vulnerability information and user information, the historical trend indicating a number of times the user has been associated with the first vulnerable device over a predetermined time period comprising one or more months;

determining whether the number of times the user has been associated with the first vulnerable device over the predetermined time period comprising the one or more months exceeds a first predetermined threshold; and responsive to determining that the number of times the user has been associated with the first vulnerable device over the predetermined time period comprising the one or more months exceeds the first predetermined threshold:

blocking external network access to the first vulnerable device;

sending the user a notification indicating that a vulnerability associated with the first vulnerable device has been detected, the notification comprising instructions extracted from a knowledge base for remedying the vulnerability associated with the first vulnerable device;

determining whether the user has been identified as being associated with one or more vulnerable devices a number of times that exceeds a second predetermined threshold; and responsive to determining that the user has been identified as being associated with one or more vulnerable devices a number of times that exceeds the second predetermined threshold:

identifying the user as a repeat offender;

blocking external network access to said user; and sending the user an additional notification, the additional notification indicating that the user has been identified as being associated with one or more vulnerable devices a number of times that exceeds the second predetermined threshold.

17. The one or more non-transitory computer readable media of claim 16, further including generating at least one report from the stored association, vulnerability information and user information.

18. The one or more non-transitory computer readable media of claim 16, further comprising instructions for:

determining a number of times the user has been associated with a vulnerable device; and restricting user access to one or more resources if the determined number of times is greater than a specified threshold.

* * * * *